Dec. 21, 1937.    T. N. SMITH    2,103,024
INTERNAL COMBUSTION ENGINE
Filed March 11, 1936    2 Sheets-Sheet 1

Inventor
Thomas Noah Smith,
By Stone, Boyden & Mack,
Attorneys.

Dec. 21, 1937. T. N. SMITH 2,103,024
INTERNAL COMBUSTION ENGINE
Filed March 11, 1936 2 Sheets-Sheet 2
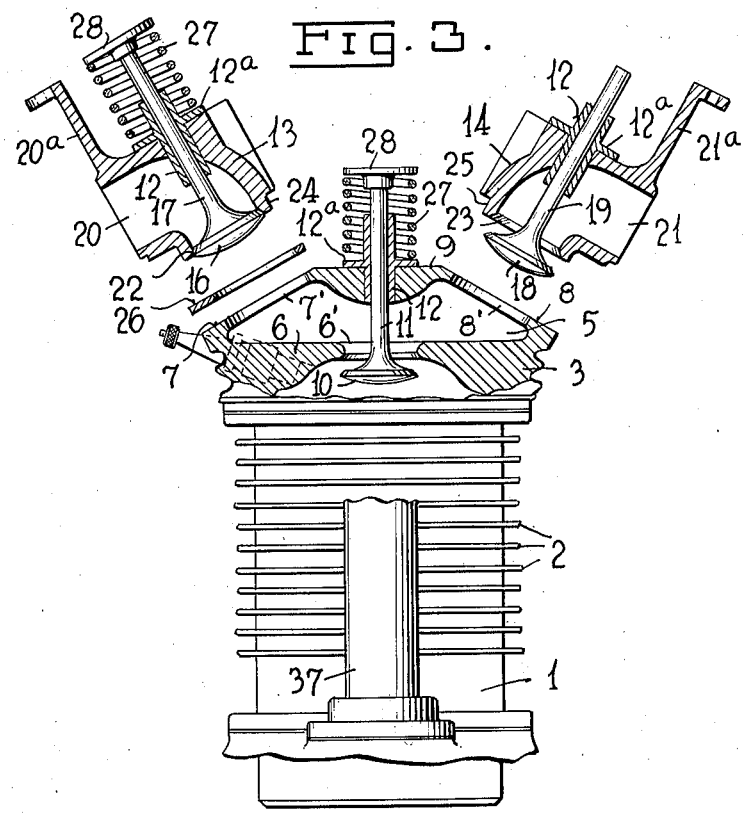
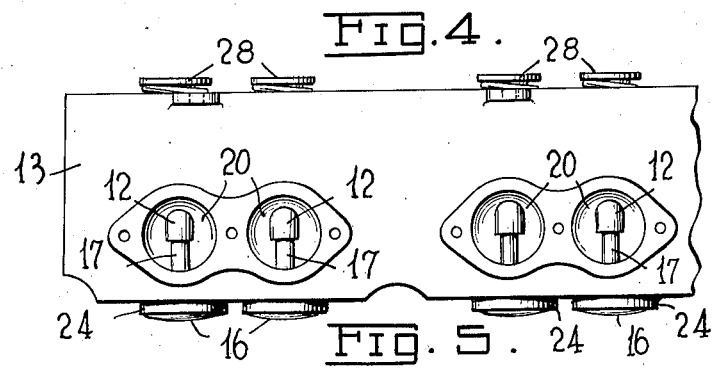
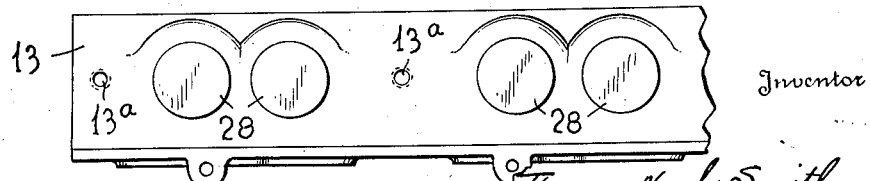
Inventor
Thomas Noah Smith,
By Stone, Boyden & Mack,
Attorneys Patented Dec. 21, 1937

2,103,024

UNITED STATES PATENT OFFICE 2,103,024

INTERNAL COMBUSTION ENGINE

Thomas Noah Smith, San Antonio, Tex.

Application March 11, 1936, Serial No. 68,303

4 Claims. (Cl. 123—79)

This invention relates to internal combustion engines and particularly, to that type of internal combustion engines in which the cylinder head is formed with an auxiliary chamber into which the intake and exhaust valves open, and in which a main valve is provided for controlling communication between the auxiliary chamber and the cylinder proper.

It is an object of this invention to provide a motor of this general type in which the groups of intake and exhaust valves are arranged in separate and removable one-piece castings and held secure along the entire line of multiple cylinders, or any cylinder arrangement, such as radial or in line, inverted or opposed or "V" type.

Another object of the invention is to provide a cylinder head of this type in which the intake and exhaust valves have their axes inclined to the axis of the cylinder to facilitate their removal.

A further object of the invention is to provide a cylinder head for an internal combustion engine of this type which may be cast in one piece and still permit the installation and removal of the intake and exhaust valve separate assemblies, at the same time supporting the main or master valve assembly controlling communication between the chamber and cylinder proper.

Still other and further objects of the invention will hereinafter appear. In the drawings:—

Fig. 3 is an end view partly broken away and partly in section, with both the intake and exhaust valve assemblies removed, showing the manner in which these valves and castings may be withdrawn;

Fig. 4 is a side elevation of the intake valve assembly itself, as it appears when removed; and Fig. 5 is a top plan view thereof.

Figure 1:
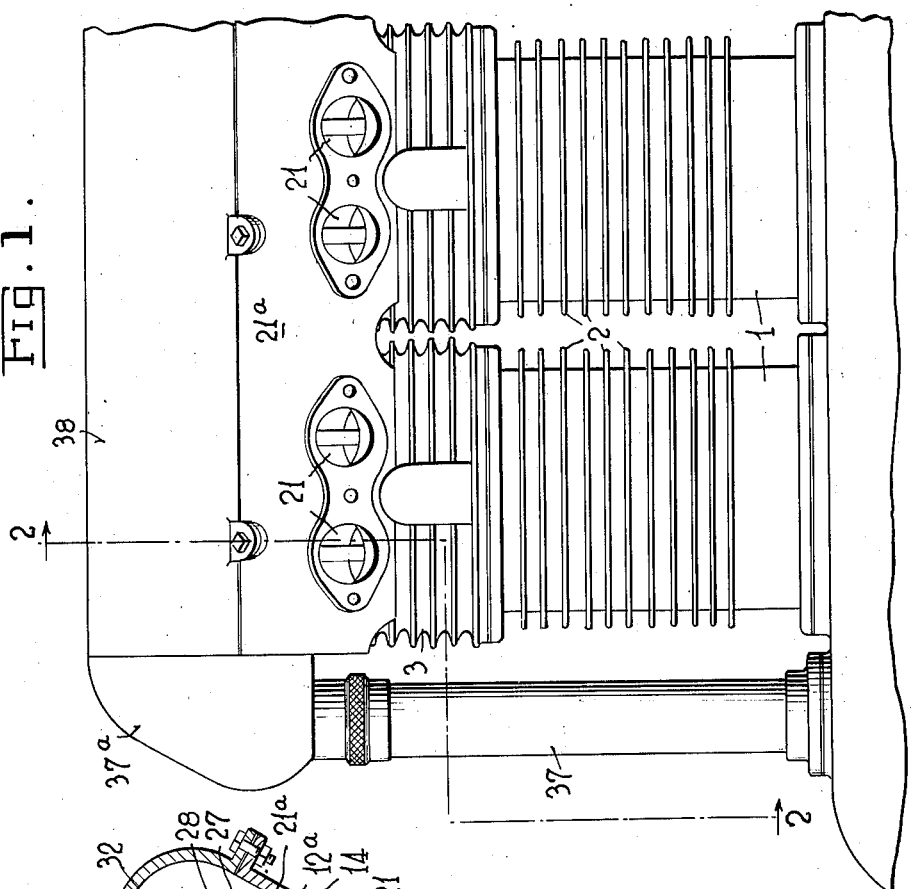
Fig. 1 is a fragmentary side view of an internal combustion engine constructed in accordance with the invention.

Referring to the drawings in detail, the engine is shown as comprising a plurality of parallel cylinders 1 provided with cooling fins 2. The cylinders are all secured at their upper ends, as by bolts, (not shown), to a cylinder head 3. This is a one piece casting extending the full length of the series of cylinders, and over each cylinder is also provided with cooling fins, as shown at 4, and is formed with a chamber 5 having an inner wall 6 and an outer wall comprising the portions 7, 8 and 9 (see Fig. 3). The inner wall 6 has a port 6' above each cylinder affording communication between the cylinder and the chamber 5, and this port is controlled by means of a main valve 10, carried by a vertical stem 11. The valve stem 11 works through a guide 12 set into an opening in the portion 9 of the outer wall, such guide having a flange 12ª which seats upon the surface of the wall. Instead of a single valve 10, a pair of simultaneously operated valves is preferably employed.

The portions 7 and 8 of the outer wall of the cylinder head are disposed on opposite sides of the axis of the cylinder, are preferably inclined, as shown in the drawings, and their plane outer surfaces form an obtuse angle with each other. The portion 9, which connects the portions 7 and 8, preferably has a flat surface, as shown. The portions 7 and 8 of the wall are formed adjacent each cylinder with openings 7' and 8' to receive the intake and exhaust valves hereinafter described. Preferably, and as shown in the drawings, a pair of intake and a pair of exhaust valves is provided for each cylinder.

One of the important and novel features of the invention resides in the fact that I provide a single unitary assembly for all of the intake valves, and a similar assembly for all of the exhaust valves, each of these assemblies being co-extensive in length with the cylinder head, and being detachably mounted thereon and removable therefrom. The intake valve assembly comprises a one piece casting 13 in which are mounted a series of pairs of intake valves 16, carried by stems 17, and closing against seats 22, while the exhaust valve assembly comprises a one piece casting 14 in which are mounted a series of pairs of valves 18 carried by stems 19 and closing against seats 23. These seats form the inner ends of curved intake passages 20 and exhaust passages 21, respectively. Each of the valve stems in both assemblies works through a guide 12 which is set into the casting and which has a flange 12ª resting upon the surface thereof.

Surrounding each intake valve 16 is an annular flange 24 and surrounding each exhaust valve 18 is an annular flange 25, these flanges 24 and 25 being adapted to fit respectively into the openings 7' and 8' formed in the portions 7 and 8, respectively, of the outer wall of the cylinder head. The valve assemblies are secured in position on the cylinder head by means of suitable bolts (not shown) passing through openings such as 13ª, (see Fig. 5), and gaskets 26 surround each flange 24 and 25 and are interposed between the castings 13 and 14 and the outer plane surface of the portions 7 and 8 of the walls in order to form a tight joint.

Surrounding the stems of all of the valves 10, 16 and 18 are compression springs 27 which are confined between the flanges 12ª of the guides 12 and a cap 28 secured to the outer end of the valve stem.

Figure 2:
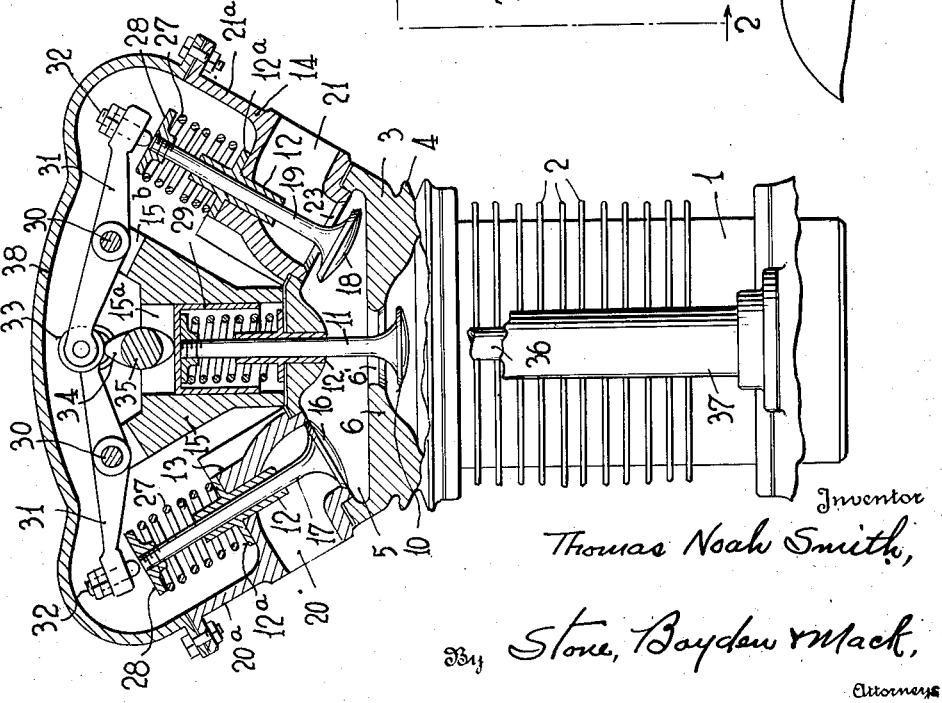
Fig. 2 is a front end view thereof, parts being in section on the line 2—2 of Fig. 1, and parts being broken away.

Referring particularly to Fig. 2, it will be seen that in addition to the valve assemblies or castings 13 and 14, there is also secured to the outer wall of the cylinder head 3, namely, to the flat middle portion 9 thereof, a third casting 15, having a series of openings 15ª therein which are concentric with the main valve stems 11 and in which is slidably mounted a cup 29 enclosing the cap and spring of each valve stem.

Pivotally mounted at 30 in bifurcated ears 15ª at each side of the casting 15 are rocker arms 31 carrying at their outer ends adjustable tappets 32 adapted to engage the outer ends of valve stems 17 and 19, and provided at their inner ends with rollers 33 adapted to engage lugs 34 on a cam shaft 35 extending centrally along the series of cylinders and journalled in the casting 15. This cam shaft also carries lugs serving to engage and depress the cups 29 and operate the associated main valves 10, it being understood, of course, that the various lugs on the cam shaft are disposed in suitable angular relation to produce the proper timing of the several intake, main and exhaust valves. The cam shaft is rotated by means of a drive shaft 36 extending upwardly through a housing 37 from the crank case of the engine, and connected with the cam shaft by means of bevel gearing, (not shown) enclosed within the housing 37ª.

A case or cover 38 encloses the valve and rocker arm mechanism and is secured at its lower edges to the upper edges of side walls 20ª and 21ª formed integral respectively with the castings 13 and 14 of the valve assemblies.

It will be seen that by disposing the walls 7 and 8, and consequently the intake and exhaust valve assemblies at an angle to each other, it is possible to remove either valve assembly independently of the other and without disturbing the casting 15 which constitutes the rocker arm support. Furthermore, it will be noted that, due to the removability of the valve assemblies, all of the valve seats in these assemblies may be readily machined before the valve assemblies are mounted upon the cylinder head. Also the plane surfaces of the outer walls of the cylinder head, and the surfaces on the castings 13 and 14 surrounding the flanges 24 and 25, may be accurately ground or machined so as to provide a tight seal when gaskets are placed between the parts.

What I claim is:

1. An internal combustion engine comprising a plurality of parallel cylinders, a cylinder head element consisting of a one piece casting to which all of said cylinders are connected, said cylinder head being formed adjacent each cylinder with a chamber having inner and outer walls, said inner wall having a valve controlled port establishing communication between said chamber and cylinder, and said outer wall having an opening at each side of said port, and intake and exhaust valve assemblies detachably secured to said outer wall, each of said assemblies comprising a single casting co-extensive in length with said cylinder head and having a series of ports in communication with said openings, and a corresponding series of spring-closed valves mounted in said casting and controlling the flow of gases through said ports and openings.

2. An internal combustion engine comprising a plurality of parallel cylinders, a cylinder head element consisting of a one piece casting to which all of said cylinders are connected, said cylinder head being formed adjacent each cylinder with a chamber having inner and outer walls, said inner wall having a valve controlled port establishing communication between said chamber and cylinder, and the portions of said outer wall at opposite sides of the axial plane of the cylinders being provided with openings and having surfaces disposed at an angle to each other, and intake and exhaust valve assemblies detachably secured respectively to said angularly disposed surfaces, each of said assemblies comprising a single casting co-extensive in length with said cylinder head and having a series of ports in communication with said openings, and a corresponding series of spring-closed valves mounted in said casting and controlling the flow of gases through said ports and openings.

3. An internal combustion engine comprising a plurality of parallel cylinders, a cylinder head element consisting of a one piece casting to which all of said cylinders are connected, said cylinder head being formed adjacent each cylinder with a chamber having inner and outer walls, said inner wall having a valve controlled port establishing communication between said chamber and cylinder, and the portions of said outer wall at opposite sides of the axial plane of the cylinders being provided with openings and having plane surfaces, and intake and exhaust valve assemblies detachably secured respectively to said plane surfaces, each of said assemblies comprising a single casting co-extensive in length with said cylinder head and a series of spring-closed valves mounted in said casting, one for each opening, and an annular flange surrounding each valve and fitting snugly within said opening.

4. An internal combustion engine comprising a plurality of parallel cylinders, a cylinder head element consisting of a one piece casting to which all of said cylinders are connected, said cylinder head being formed adjacent each cylinder with a chamber having inner and outer walls, said inner wall having a valve controlled port establishing communication between said chamber and cylinder, and said outer wall having portions at opposite sides of the axial plane of the cylinders with surfaces disposed at an angle to each other, and a central portion connecting said angularly disposed portions; a rocker arm supporting casting mounted on said central portion, a cam shaft journalled in said casting, intake and exhaust valve assemblies detachably secured respectively to said angularly disposed surfaces, each of said assemblies comprising a single casting co-extensive in length with said cylinder head and a series of valves mounted therein, and rocker arms pivoted on said supporting casting and actuated by said cam shaft, said rocker arms being arranged to operate said valves.

THOMAS NOAH SMITH.